Feb. 16, 1937.  L. A. PHILIPP  2,071,175
REFRIGERATING APPARATUS
Filed May 24, 1934
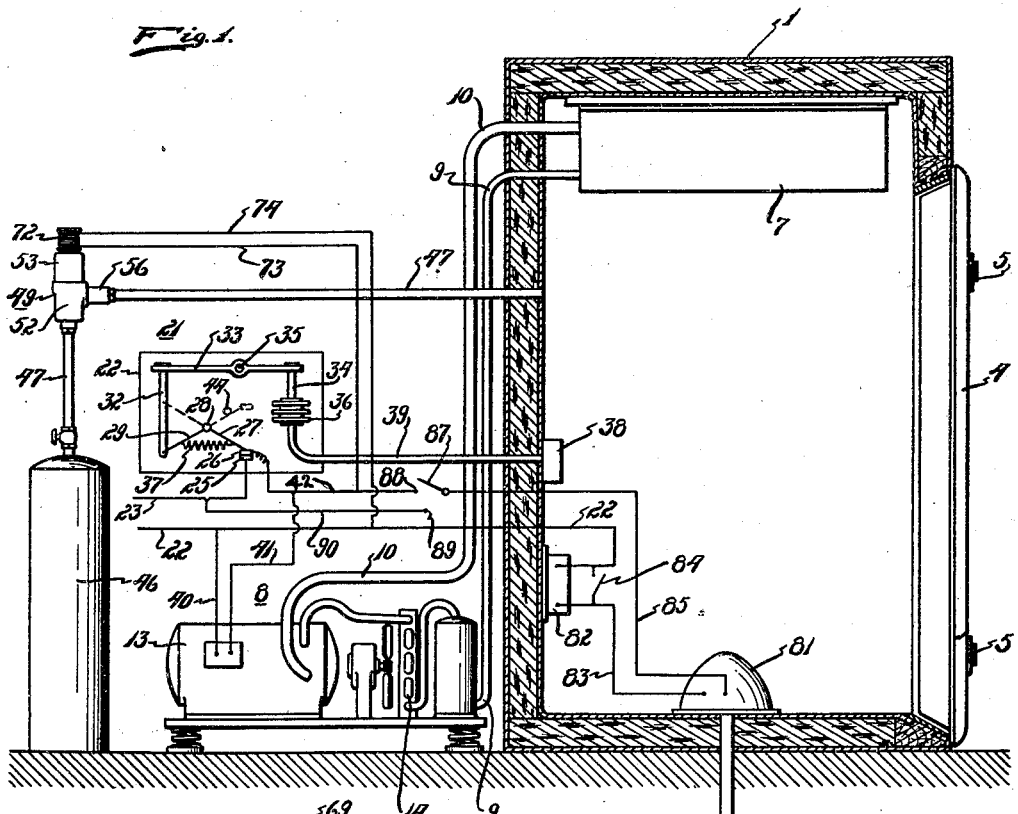
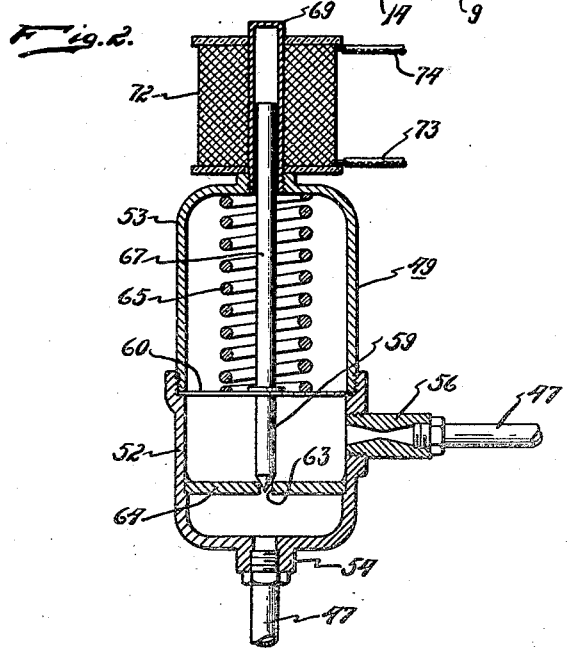
INVENTOR.
LAWRENCE A. PHILIPP
BY
Warren H. F. Schmidt
ATTORNEY.

Patented Feb. 16, 1937

2,071,175

UNITED STATES PATENT OFFICE 2,071,175

REFRIGERATING APPARATUS

Lawrence A. Philipp, Detroit, Mich., assignor to Kelvinator Corporation, Detroit, Mich., a corporation of Michigan Application May 24, 1934, Serial No. 727,262

8 Claims. (Cl. 62—6)

My invention pertains to a refrigerated florist's box and more particularly to a refrigerator inclosure in which the air is automatically conditioned for the preservation of flowers.

It is well known that the time period during which articles of organic nature may be stored without appreciable decomposition may be extended by lowering the temperature of the storage space. It has been discovered that the time during which cut flowers and vegetables can be safely stored may be extended over much longer periods of time if suitable humidity conditions are maintained and if a small quantity of a preservative gas such as carbon dioxide is introduced into the storage compartment.

Refrigerated boxes are customarily used by florists for the preservation and storage of cut flowers, but three days is usually considered to be the greatest length of time flowers can be stored in this manner. Since cut flowers which are stored longer than three days in the usual manner are not saleable losses of florists from this cause are considerable.

It has been found, however, that by the maintenance of suitable humidity conditions and carbon dioxide concentrations within the refrigerated box certain cut flowers such as roses may be safely stored as long as seven days, or more than twice as long as they could be stored in the usual manner. Because of the very perishable nature of cut flowers, an improved method of and means for storing is of particular value to florists although it is also of value in storing perishable objects other than flowers.

It is accordingly an object of my invention to provide a refrigerated box in which the atmosphere is automatically conditioned for the preservation of flowers or objects of similar organic nature.

It is a further object of my invention to provide a refrigerator cabinet with means for periodically introducing a preservative gas and for maintaining proper conditions of humidity therein.

It is also an object of my invention to provide a method of and means for prolonging the storage period of perishable articles such as cut flowers.

In accordance with my invention I provide a refrigerated florist's box or other storage compartment with means for automatically introducing suitable regulated quantities of carbon dioxide and water vapor to maintain the optimum conditions for the preservation of the articles stored therein.

The invention itself, however, both as to its organization and its method of operation, together with additional objects and advantages thereof, will best be understood from the following description of a specific embodiment, when read in conjunction with the accompanying drawing, in which:

Fig. 1 is a sectional view partly diagrammatic showing a refrigerated florist's box provided with an air carbonator and humidifier in accordance with my invention; and Fig. 2 is a sectional view showing the valve by which the carbon dioxide is automatically admitted.

Referring more specifically to the drawing the apparatus comprises a cabinet or box 1 enclosed by heat insulating walls and provided with a removable closure member 4 supported on hinges 5 at one side of the cabinet in accordance with the usual construction. The cabinet is provided with a cooling unit or refrigerant evaporator 7 mounted in the upper portion of the enclosed compartment.

The cooling unit 7 is supplied with a vaporizable refrigerant from an adjacent compressor unit 8 to which it is connected through suitable conduit means 9 and 10. The compressor unit 8 may comprise a compressor enclosed within a hermetically sealed casing 13 and connected to a condenser 14 in which the refrigerant is compressed and condensed in the usual manner. A fan may be provided adjacent the condenser for circulating the air therethrough to carry away the latent heat of condensation, and a suitable float or expansion valve may control the admission of the liquid refrigerant to the evaporator in the well known manner.

The compressor unit 8 may be actuated at intervals in accordance with the temperature within the cabinet by means of a thermostatically controlled switch 21 which connects the compressor motor to the service mains 22 and 23. The switch 21 comprises a stationary contact 25 supported on the switch panel 22 and a movable contact 26 which is carried on one end of a contact arm 27. The other end of contact arm 27 is journalled freely on a stationary pivot pin 28 on the panel. A toggle arm 29 is also journalled at one end on the stationary pivot pin 28, and its opposite end is connected through a link 32 to one end of an actuator lever 33, which has its opposite end connected through a link 34 to an expansible metal bellows 36. The actuator lever 33 is journalled on a stationary pivot pin 35. A toggle spring 37 is tensioned between the contact arm 27 and the toggle arm 29, and serves to snap the contact arm 27 up or down in accordance with the actuated position of the toggle arm 29.

A thermo bulb 38 mounted in the refrigerated compartment contains a vaporizable liquid and is connected to the expansible bellows through a conduit 39. When the temperature in the compartment rises it vaporizes the liquid causing the bellows 36 to expand which in turn rotates the actuator lever 33 and the toggle arm 29 counter clockwise until the toggle arm 29 is turned to a position which is lower than an aligned position with the contact arm. As soon as the toggle arm 29 passes below the aligned position, the toggle spring 37 snaps the contact arm 27 down thereby carrying the movable contact 26 into engagement with the stationary contact 25, as shown in heavy lines. This completes the motor energizing circuit from line conductor 22 through a conductor 40 to the compressor motor thence through conductors 41 and 42 to the moving contact 26, thence to the stationary contact 25 and return to the other line conductor 23.

When the temperature in the compartment has been sufficiently lowered by the operation of the compressor unit, the bellows 36 contracting rotates the toggle arm 29 clockwise until it is above its aligned position with the contact arm 27, when the toggle spring 37 suddenly snaps the contact arm upwardly against a suitable stop 44, in the position indicated by dotted lines. This movement opens the compressor motor circuit and stops the operation of the compressor unit. The intermittent operation of the switch 21 to its "on" and "off" positions by the expansible bellows 36 thus automatically regulates the temperature within the cabinet.

In order that a preservative atmosphere may be maintained within the cabinet 1, I have provided means for admitting a regulated quantity of a preservative gas such as carbon dioxide therein. For this purpose carbon dioxide may be supplied from a drum 46 of liquid carbon dioxide which is connected by a conduit 47 to the cabinet 1 through an electromagnetically controlled valve 49 for regulating the release of the gas.

As shown in Fig. 2, a suitable valve for controlling the release of the gas comprises a valve casing shell consisting of two threadably engaged portions 52 and 53. One portion 52 of the valve shell is provided with a threaded pipe fitting 54 by which it may be connected to the conduit 47 extending from the drum, also with a laterally projecting orifice 56 which is internally restricted to properly throttle the gas and is provided with a thread at its outer end to receive the conduit 47 leading into the cabinet.

Within the valve casing shell a valve plunger 59 of non-magnetic material is supported by a yieldable diaphragm like member 60 which may be perforated to permit the free passage of leakage gas therethrough to the upper portion of the casing shell. The free end of the valve plunger is provided with a tapered portion which fits into a valve seat 63 in a rigid disc 64 which is hermetically sealed around its edges to the casing shell 52.

The valve plunger 59 is normally depressed upon its seat in gas tight sealing relation by the biasing force of a helical compression spring 65 disposed between the opposite end of the casing and the diaphragm 60 in conjunction with the weight of a cylindrical armature member 67 of magnetic material which is concentrically disposed within the compression spring 65 and rests at one end upon the diaphragm 60. The free end of the armature 67 projects through an aperture in the end of the valve casing 53 into a tubular thimble like member 69 of non-magnetic material which is hermetically sealed in the aperture and extends outwardly from the casing. A solenoid winding 72 is provided on the non-magnetic thimble 69 for actuating the armature 67.

Normally the weight of the armature 67 resting upon the diaphragm 60 is sufficient to hold the valve plunger 59 in gas sealing engagement on the valve seat. But when the solenoid winding 72 is energized, and the armature member 67 is lifted, the compression of the spring 65 is not sufficient to keep the valve closed.

In order that the admission of carbon dioxide from the drum 46 may be automatically controlled, the solenoid winding 72 may be connected in parallel with the compressor by suitable conductors 73 and 74 joined to the respective motor energizing conductors 42 and 22.

To properly humidify the atmosphere within the compartment it is moistened by a humidifier 81 which is preferably mounted in the bottom of the compartment. The humidifier comprises a small water spray which is controlled by an electro magnetic valve of any well known construction which is connected to the compressor energizing circuit whereby the valve is automatically opened to admit water to the spray when the compressor operates. A humidity responsive circuit make and break device, such as a humidistat 82, is preferably connected in series in the humidifier circuit for interrupting the operation thereof when the desired degree of humidity is created in the box. For this purpose a conductor 83 extends from the humidifier to one terminal of the humidistat 82 the terminal of which is connected to the conductor 22. A shunting switch 84 may be provided to shunt out the humidistat control if desired. The other terminal of the humidifier valve is connected by a conductor 85 to the compressor energizing conductor 42 whereby the humidifier solenoid is connected in parallel with the compressor.

In order to provide greater flexibility of adjustment a two point switch 87 may be provided in series between the humidifier energizing conductor 85 and the conductor 42. One stationary contact 88 of the 2 point switch 87 is connected through conductor 42 to the movable contact 26 of the thermostatic switch, the second stationary contact 89 is connected through a conductor 90 directly to the line conductor 23, and the movable switch blade 87 is connected through conductor 85 to the humidifier. By moving the switch blade 87 to engage the first stationary contact 88 the humidifier may be set to operate when the compressor motor operates, or by engaging the second stationary contact 89 it may be set to operate continuously, except that in either case its operation will be interrupted by the series connected humidostat switch 82 when the desired degree of humidity is created. However, by closing the shunting switch 84 the humidistat function can be omitted if desired.

In operation the quantity of carbon dioxide gas that must be admitted in order to maintain a desirable concentration in the box depends largely upon how often the door is opened thereby venting the box and permitting the gas to escape. This is also true of the amount of water vapor that must be added to maintain the desired humidity. Therefore in accordance with my invention I have provided for the operation of the valves associated with the gas container and the humidifier simultaneously with the automatic operations of the compressor to thereby admit quantities of preservative gas and moisture which are automatically regulated in accordance with the conditions within the cabinet.

I wish it to be understood that by adjusting the humidifier for a very fine spray it may be operated continuously and the electromagnetic control may be omitted if preferred and that either series or other circuit connections may be utilized instead of parallel connections depending upon the relative current carrying capacities of the elements to be energized as will be readily understood by those skilled in the art.

It will be seen that I have provided a simplified arrangement for automatically admitting a preservative gas and water vapor to maintain proper conditions to retard the decomposition of flowers or other objects of similar organic nature within a refrigerator cabinet.

I do not wish to be restricted to the specific structural details, arrangement of parts or circuit connections herein set forth, as various modifications thereof may be effected without departing from the spirit and scope of my invention.

I claim:

1. In combination a heat insulated cabinet, a refrigerant evaporator therein, a refrigerant compressor associated therewith, thermo responsive means for operating said compressor in accordance with the temperature conditions in the cabinet, a source of water vapor, means for controlling the water vapor and means for operating the latter in accordance with the operating time of said compressor.

2. In combination a heat insulated cabinet, a refrigerant evaporator therein, a refrigerator compressor associated therewith, thermo responsive means for operating said compressor in accordance with the temperature conditions in the cabinet, a humidifier within said cabinet, an electromagnetic valve for controlling said humidifier, a gas container, an electromagnetic valve associated therewith, conduit means connecting said container to said cabinet through said valve, and electrically conductive means associated with said electromagnetic valves for actuating the humidifier and for admitting gas from said container in accordance with the operation of said compressor.

3. In combination with a heat insulated box, means for automatically refrigerating said box, and means for admitting a preservative gas to said box in accordance with the operations of said automatic refrigerating means, water vapor admitting means, humidity responsive means in said box and means controlled jointly by said humidity responsive means and said automatic refrigerating means to actuate said water vapor admitting means.

4. In combination a heat insulated cabinet, a refrigerant evaporator therein, a refrigerant compressor associated therewith, an electric motor for operating said compressor, an energizing circuit for said motor, a thermostatic switch having its contacts interposed in said motor energizing circuit for operating said compressor in accordance with the temperature conditions in said cabinet, means comprising an electromagnetic valve for admitting water vapor to said cabinet, a humidistat in said cabinet, and conductors for energizing said electromagnetic valve through said humidistat from the thermostatically controlled energizing circuit of said motor 5. In combination a heat insulated cabinet, a cooling unit therein, refrigerant supply means, control means for intermittently operating said refrigerant supply means for supplying refrigerant to maintain predetermined temperature conditions, a humidifier in said cabinet, a humidistat in said cabinet, and means for controlling said humidifier simultaneously from said humidistat and said control means whereby sluggish response of the humidistat will not materially over regulate the humidity.

6. In combination a heat insulated cabinet, a refrigerant evaporator therein, a refrigerant compressor associated therewith, an electric motor for operating said compressor, an energizing circuit for said motor, a thermostatic switch having its contacts interposed in said motor energizing circuit for operating said compressor in accordance with the temperature conditions in said cabinet, a tank of carbon dioxide, a conduit connecting from said tank into said cabinet, an electro-magnetic valve interposed in said conduit, and conductors for actuating said electro-magnetic valve from the motor energizing circuit when the motor is operated.

7. In combination a heat insulated cabinet, a refrigerant evaporator therein, a refrigerant compressor associated therewith, an electric motor for operating said compressor, an energizing circuit for said motor, a thermostatic switch having its contacts interposed in said motor energizing circuit for operating said compressor in accordance with the temperature conditions in said cabinet, means comprising an electro-magnetic valve for admitting water vapor to said cabinet, a humidistat in said cabinet, conductors for energizing said electro-magnetic valve through said humidistat from the thermostatically controlled energizing circuit of said motor, a tank of carbon dioxide, a conduit connecting from said tank into said cabinet, a valve interposed in said conduit, electro-magnetic actuating means for said valve, and conductors connected from said magnetic actuating means to said motor energizing circuit for actuating said valve to admit carbon dioxide when the motor is operated.

8. In combination an insulated cabinet, a refrigerant evaporator therein, a refrigerant compressor connected with said evaporator for supplying refrigerant thereto, thermo responsive means for actuating said compressor in accordance with the temperature in said cabinet, a tank of high-pressure preservative gas, conduit means for conducting gas from said tank into the cabinet and valve means for automatically controlling the admittance of gas to the cabinet in accordance with the operating time of the compressor.

LAWRENCE A. PHILIPP.